INVENTOR

SIEGFRIED VOLLPRECHT

BY Michael S. Striker

HIS ATTORNEY

United States Patent Office 3,330,479
Patented July 11, 1967

3,330,479
THERMOSTATIC VALVE
Siegfried Vollprecht, Wernau (Neckar), Germany, assignor to Junkers & Co. G.m.b.H., Wernau, Germany
Filed Aug. 10, 1965, Ser. No. 478,537
Claims priority, application Germany, Sept. 2, 1964, J 26,492
4 Claims. (Cl. 236—48)

ABSTRACT OF THE DISCLOSURE

A thermostatic valve in which a valve member is pressed by fluid and spring pressure against a valve seat and in which means for moving the valve member away from the valve seat comprise a motion-transmitting member coaxial with and guided for rectilinear movement toward and away from the valve seat and provided with an eccentric projection positioned to engage the valve member so that the latter may be tilted with reference to the seat to provide a narrow gap between the seat and the valve member through which fluid may pass, and means including a thermostat for moving the motion transmitting member toward the seat with a predetermined force necessary to tilt the valve member on engagement with the projection and to subsequently move the valve member further away from the seat.

---

The present invention relates to valves in general, and more particularly to improvements in valves which are especially suited for controlling the flow of compressed fuel from a source to one or more burners or other types of consuming stations. Still more particularly, the invention relates to a valve which may be used with advantage in assemblies wherein the flow of compressed fuel or another compressed fluid is controlled by a thermostat. An assembly in which the improved valve may be put to use is disclosed, for example, in the copending patent application Ser. No. 315,487 of Vollprecht and Schmid filed on Oct. 11, 1963.

As a rule, a thermostat can produce a rather weak force so that a valve member which opens in response to forces generated and transmitted by a thermostat cannot be subjected to very strong closing or sealing pressures; otherwise, the thermostat would be unable to open the valve member in response to a predetermined temperature change. Serious problems arise when the valve member which must be moved away from its seat by a thermostat is biased into sealing engagement with its seat by a valve spring and also by the pressure of a compressed fluid which bears against one side or face of the valve member and cooperates with the spring to maintain the valve member in sealing position.

Accordingly, it is an important object of the present invention to provide a valve which is constructed and assembled in such a way that a relatively small force suffices to move the valve member away from its seat against the pressure of a rather highly compressed fluid which bears against one side of the valve member and tends to maintain the valve member in sealing position.

Another object of the invention is to provide a valve of the just outlined characteristics wherein a relatively weak opening force suffices to overcome not only the pressure of compressed fluid but also the bias of a relatively strong valve spring which tends to maintain the valve member in sealing engagement with its seat.

A further object of the invention is to provide a valve wherein a rather weak thermostat can open the valve member against the action of a relatively strong closing spring plus the pressure of a highly compressed gaseous or liquid fuel or another fluid medium.

An additional object of the invention is to provide a valve of the above outlined characteristics wherein the valve member may be opened in stages and wherein the delay with which the valve member is moved from sealing position to fully open position may be determined in advance and with utmost accuracy.

A concomitant object of the invention is to provide a novel motion transmitting connection between a valve member and a thermostat.

Still another object of the instant invention is to provide a valve of the above outlined characteristics wherein the entire valve member may be moved away from its seat so as to permit practically unobstructed flow of compressed fluid at a maximum rate from a source to one or more consuming or processing stations.

Another object of the invention is to provide a very simple, compact, inexpensive and very rugged valve which embodies the above outlined features and advantages and which may be readily installed in many presently known fuel consuming machines or apparatus as well as in many other types of automatic apparatus wherein it is desirable to control the flow of compressed fluids by exertion of a relatively small force.

An additional object of the instant invention is to provide a valve of the above outlined characteristics which can be substituted for two or more conventional valves without affecting the utility, versatility and/or useful life of the assembly in which such substitution is made.

Briefly stated, one feature of my present invention resides in the provision of a valve which comprises a housing defining a plenum chamber connected to a supply of compressed fuel or another fluid, a second chamber which is connected to a consumer of such fluid, and a seat which provides a passage for the flow of fluid from the plenum chamber into the second chamber, a valve member provided in the plenum chamber and normally abutting against the seat to seal the chambers from each other whereby the pressure differential between the chambers causes the valve member to bear against the seat, and means for moving the valve member away from the seat to permit escape of fluid into the second chamber. In accordance with my invention, such moving or opening means comprises a preferably cylindrical or tubular motion transmitting member provided in the second chamber and reciprocable toward and away from the valve member, guide means supporting the motion transmitting member for such reciprocatory movement, a projection provided on the motion transmitting member and positioned off the center of the seat so that a portion of the valve member may be tilted by the projection out of sealing engagement with the seat to provide a relatively narrow gap through which the fluid may flow into the second chamber, and means (preferably including a thermostat) for moving the motion transmitting member toward the valve member with a predetermined force necessary to tilt the valve member on engagement with the projection to form the relatively narrow gap whereby the pressure differential between the two chambers decreases automatically and such predetermined force suffices to move the valve member further away from the seat to increase to a maximum the rate of fluid flow into the second chamber.

In most instances, the plenum chamber accommodates a valve spring which also biases the valve member against the seat so that, in order to tilt the valve member, the force produced by the thermostat must be large enough to overcome the bias of the valve spring and the pressure differential between the two chambers. However, such force is still much smaller than a force which is needed to immediately move the valve member to fully open position, i.e., entirely out of sealing engagement with the seat.

The novel features which are considered as characteristic of the invention are set forth in particular in the appended claims. The improved valve itself, however, both as to its construction and its mode of operation, together with additional features and advantages thereof, will be best understood upon perusal of the following detailed description of a specific embodiment with reference to the accompanying drawings, in which:

Figure 1:
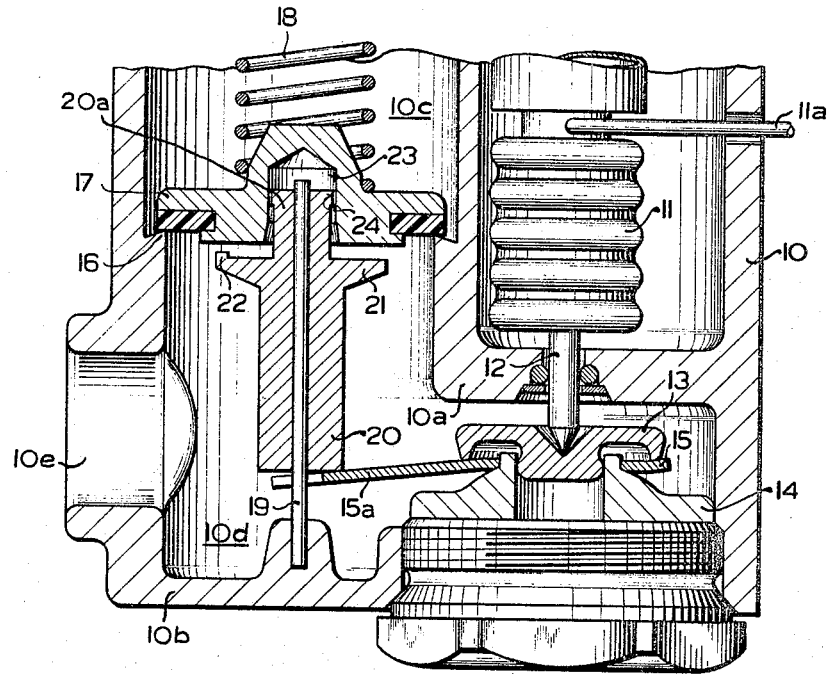
FIG. 1 is an axial section through an assembly including a valve which embodies my invention, the valve member being shown in closed position.

Referring first to FIG. 1, there is shown a portion of a valve assembly of the general class disclosed in the aforementioned copending application Ser. No. 315,487. The valve assembly comprises a casing or housing 10 which accommodates an expansive element 11 forming part of an expanding thermostat and including a reciprocable stud 12 extending through an internal wall or partition 10a of the housing 10. The numeral 11a denotes a conduit which leads to a well-known temperature sensing device, not shown. The pointed end of the stud 12 extends downwardly and beyond the partition 10a and into a centrally located conical recess provided in the top face of a switching disk 13. The downwardly extending annular collar of the switching disk 13 bears against the top face of a deformable elastic annular washer 15 which rests on a supporting block 14, the latter forming part of a threaded plug which is screwed into the bottom wall 10b of the housing 10. The washer 15 constitutes a component of the means for opening the improved valve and comprises a radially extending springy arm 15a whose tip is bifurcated and straddles a rigid elongated guide rod 19. The valve further comprises an annular seat 16 which is defined by the housing 10, a disk-shaped valve member 17 an annular portion of which normally abuts against the seat 16, and a strong helical valve spring 18 which biases the valve member 17 against the seat. Thus, the spring 18 serves as a means for closing the valve and, in order to move the valve member 17 away from the seat 16, the arm 15a of the washer 15 must overcome the bias of the spring 18 plus the pressure of fuel which acts against the top face of the valve member. The partition 10a divides the interior of the housing 10 into two chambers including a high-pressure chamber or plenum chamber 10c at the upper side of the seat 16 and a low-pressure second chamber 10d at the lower side of the seat 16. The plenum chamber 10c communicates with a suitable fuel-admitting inlet (not shown) which is connected to a source of compressed fuel, and the second chamber 10d is in communication with an outlet 10e which can admit fuel to one or more burners, not shown, serving to heat a boiler or the like.

In accordance with a feature of my invention, the operative connection between the arm 15a of the elastic washer 15 and the valve member 17 comprises a hollow cylindrical motion transmitting member 20 which is reciprocable along the guide rod 19 and whose upper end portion 20a extends with at least some clearance into a blind bore or recess 23 provided in the underside or lower face of the valve member 17, i.e., the valve member is tiltable with reference to the motion transmitting member 20 to the extent determined by a short annular bead 24 provided at the tip of the upper end portion 20a. The axis of the guide rod 19 passes through the center of the valve seat 16.

Figure 2:
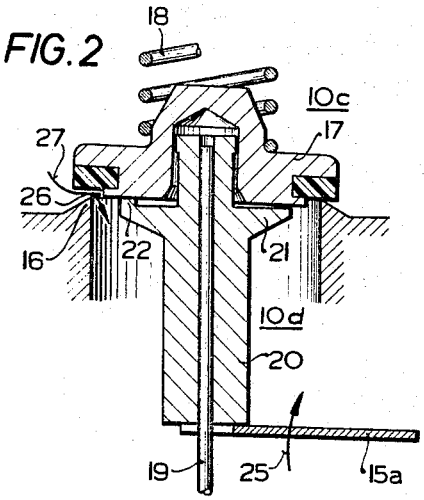
FIG. 2 is a fragmentary axial section through the valve but showing the valve member in partly open position.

The motion transmitting member 20 is further provided with an annular collar 21 which is formed with an upwardly extending projection or lobe 22 located eccentrically with reference to the axis of the valve member 17 (i.e., off the center of the seat 16) and serving to tilt the latter from the closed position of FIG. 1 to the partly open position shown in FIG. 2. The projection 22 is preferably located at the periphery of the collar 21 so that it may engage the underside of the valve member 17 at a considerable distance from the axis of the guide rod 19. The aforementioned short axially extending annular bead 24 at the topmost end of the motion transmitting member 20 is fully accommodated in the recess 23 and determines the extent to which the valve member 17 may be tilted with reference to the motion transmitting member 20. Such small tilting of the valve member 17 is necessary in order to bring about partial opening of the valve.

Figure 3:
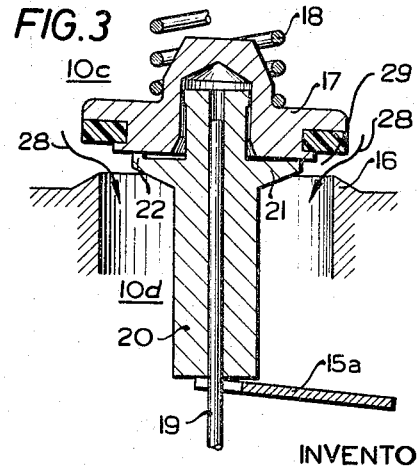
FIG. 3 illustrates the structure of FIG. 2 but with the valve member in fully open position.

When the element 11 of the thermostat expands, the stud 12 moves downwardly and causes the switching member 13 to deform the washer 15 whereby the arm 15a moves from the end position shown in FIG. 1 (see the arrow 25 in FIG. 2) toward the end position shown in FIG. 3. The bias of the arm 15a is strong enough to overcome the bias of the valve spring 18 and the pressure differential between the chambers 10c, 10d so that, when the projection 22 engages the underside of the valve member 17, the latter is tilted on the upper end portion 20a of the motion transmitting member 20 (to the extent determined by the annular bead 24) and opens a relatively narrow non-circular gap 26 between a portion of the seat 16 and the underside of the valve member 17 so that some fuel can escape in the direction indicated in FIG. 2 by an arrow 27. The fuel escaping through the narrow gap 26 raises the pressure in the second chamber 10d so that the pressure differential between the chambers 10c and 10d is rapidly reduced with the result that the fuel pressure upon the top face of the valve member 17 decreases and the arm 15a can overcome the bias of 17 plus the remaining pressure differential to lift the valve member 17 entirely off the seat 16 and to move the valve member to the fully open position of FIG. 3 in which the fuel can flow at a maximum rate by escaping through a large annular gap 29 as indicated by the arrows 28. It will be seen that the valve member 17 remains in tilted position because the spring 18 causes it to bear against the projection 22 of the collar 21. As soon as the valve member 17 assumes the fully open position of FIG. 3, almost the entire end portion 20a enters the recess 23 and the underside of the valve member then bears not only against the projection 22 but also against a portion of the collar 21 located diametrically opposite the projection 22. The width of the relatively narrow gap 26 shown in FIG. 2 may be selected in such a way that the pressure differential between the chambers 10c, 10d is rapidly reduced to zero so that, once the pressure in the second chamber 10d equals the pressure in the plenum chamber 10c, the arm 15a must overcome only the bias of the spring 18. The valve member 17 remains in the fully open position of FIG. 3 until the temperature in the zone measured by the thermostat drops below a predetermined value, i.e., until the stud 12 rises to such a level that the pressure upon the washer 15 is relieved and the washer returns its arm 15a to the inactive position of FIG. 1. The spring 18 then automatically returns an annular portion of the valve member 17 into sealing engagement with the seat 16.

The width of the gap 26 may be determined in advance by proper selection of the height of the projection 22 and/or by proper selection of the distance between the axis of the guide rod 19 and the projection 22. The delay with which the valve member 17 moves from the intermediate or partly open position of FIG. 2 to the fully open position of FIG. 3 will depend on the cross-sectional area of the gap 26 because the area of this gap determines the speed at which the pressure differential between the chambers 10c and 10d decreases sufficiently to allow for further movement of the arm 15a to the end position of FIG. 3.

A very important advantage of the valve shown in

FIGS. 1 to 3 is that a relatively weak springy arm 15a can open a valve member 17 which is biased by a rather strong spring 18 and against a substantial pressure upon the top face of the valve member. The provision of the guide rod 19, motion transmitting member 20 and its projection 22 involves a rather small additional expenditure in time and material. The guide rod 19 should be strong enough to prevent lateral movements of the motion transmitting member 20 and this rod should be rigid enough to avoid flexing in response to bending stresses transmitted by the eccentrically positioned projection 22. Also, the guide rod 19 should be long enough to insure that the axial distance between the collar 21 and the lower end of the motion transmitting member 20 can exceed the radial distance between the axis of the rod 19 and the projection 22; this insures that the tilting stresses transmitted by the projection 2 (when the latter bears against the underside of the valve member 17) cannot prevent, and hinder only negligibly, axial movements of the member 20 along the guide rod. The greater the distance between the collar 21 and the arm 15a, the smaller is the resistance which the member 20 offers to axial movement in response to the bias of the arm 15a.

It is clear that the improved valve can be modified in a number of ways without departing from the spirit of my invention. For example, the projection 22 may assume the form of a lobe having a cam face which is inclined with reference to a plane that intersects at right angles the axis of the guide rod 19, or the projection 22 may be adjustably secured to the member 20. Also, the projection 22 may resemble an arc which extends along a portion of the circumference of the collar 21. Still further, though the improved valve is particularly useful in an assembly which is controlled by a thermostat, it is clear that the parts 11–15a may be replaced by different opening means which must be strong enough to tilt the valve member 17 by exerting against the motion transmitting member 20 a stress which suffices to tilt the valve member 17 to the position of FIG. 2 and to thereupon maintain such stress long enough to move the valve member to the fully open position of FIG. 3 as soon as the pressure differential between the chambers 10c and 10d decreases.

When used in a water heater or the like, the valve of my invention may serve to admit fuel from a source (connected with the plenum chamber 10c) to one or more burners which are connected with the outlet 10e of the second chamber 10d. When in partly open position of FIG. 2, the valve member 17 will allow fuel to enter the burner or burners at a reduced rate, but the rate of flow increases automatically with a delay which is determined by the cross-sectional area of the narrow non-circular gap 26 and by the pressure differential between the chambers 10c and 10d.

In many instances, the improved valve can replace two or more valves. Thus, certain valve assemblies which are provided with a rather weak thermostat include a main valve and one or more auxiliary valves. The auxiliary valves are opened in the first step to reduce the pressure differential and to reduce the force which is necessary to open the main valve, and the main valve is opened in the next-following step. My improved valve can readily replace a main valve and one or more auxiliary valves because it automatically reduces the pressure differential between the chambers 10c, 10d prior to moving the valve member 17 to its fully open position.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. A thermostatic valve for regulating the flow of fuel to a burner, comprising a housing defining a plenum chamber containing a compressed fluid, a second chamber, and an annular valve seat providing a passage for the flow of fluid from said plenum chamber into said second chamber; a disk-shaped valve member located in said plenum chamber and having an annular portion normally abutting against said seat whereby the pressure differential between said chambers causes the valve member to bear against said seat, said valve member further having a side facing toward said second chamber and provided with a centrally located blind bore; a valve spring arranged to bias said valve member against said seat; and means for moving said valve member away from said seat, comprising a rigid elongated guide rod fixed to said housing and extending into said second chamber coaxially with said seat, a hollow cylindrical motion transmitting member coaxial with and reciprocably supported by said guide rod for movement toward and away from said seat, said motion transmitting member comprising an end portion extending with clearance into said blind bore so that the valve member is tiltable with reference to said end portion, an annular collar rigid with said motion transmitting member and adjacent said valve member, an eccentric projection provided on said annular collar and positioned to engage said valve member in close proximity of said annular portion so that said valve member may be tilted with reference to the seat and with reference to the end portion of said motion transmitting member to provide a relatively narrow gap for entry of fluid into said second chamber, and means including a thermostat for moving said motion transmitting member toward said seat with a predetermined force necessary to tilt said valve member on engagement with said projection whereby said pressure differential decreases in response to flow of fluid into said second chamber and such predetermined force suffices to move the valve member further away from said seat.

2. A valve as set forth in claim 1, wherein the end portion of said motion transmitting member comprises means for determining the extent to which said valve member may be tilted with reference to said end portion.

3. A valve as set forth in claim 1, wherein the end portion of said motion transmitting member comprises a bead received in said bore to determine the extent to which said valve member may be tilted with reference to said end portion.

4. A valve as set forth in claim 1, wherein the means for moving said motion transmitting member comprises further a springy arm engaging said motion transmitting member and arranged to transmit said predetermined force in response to a predetermined temperature change.

References Cited

UNITED STATES PATENTS

| | | | |
|---|---|---|---|
| 662,503 | 11/1900 | Schmidt | 251—82 |
| 1,705,787 | 3/1929 | Shuell et al. | 236—102 |
| 1,950,120 | 3/1934 | McKee | 137—505.36 |
| 2,069,069 | 1/1937 | Horton | 251—77 |
| 2,906,460 | 9/1959 | Daly | 236—48 |
| 2,925,221 | 2/1960 | Currie | 236—48 |

WILLIAM J. WYE, *Primary Examiner.*

ALDEN D. STEWART, *Examiner.*